(12) United States Patent
Watkins

(10) Patent No.: US 6,445,408 B1
(45) Date of Patent: Sep. 3, 2002

(54) HEADREST AND SEAT VIDEO IMAGING APPARATUS

(76) Inventor: D. Scott Watkins, 470 Elgaen Ct., Roswell, GA (US) 30075

( * ) Notice: Subject to any disclaimer, the term of this patent is extended or adjusted under 35 U.S.C. 154(b) by 0 days.

(21) Appl. No.: 09/597,363

(22) Filed: Jun. 19, 2000

Related U.S. Application Data

(63) Continuation-in-part of application No. 09/398,910, filed on Sep. 14, 1999, which is a continuation-in-part of application No. 09/252,265, filed on Feb. 18, 1999, which is a continuation-in-part of application No. 09/121,155, filed on Jul. 22, 1998.

(51) Int. Cl.[7] .................................................. H04N 7/18
(52) U.S. Cl. .......................... 348/148; 348/143; 348/61; 297/238; 297/217; 224/275
(58) Field of Search ...................... 348/148, 81, 143, 348/149, 151, 158; 248/205 R; 224/275, 483, 551, 564; 340/973; 354/293; 297/238, 217; 386/46; 381/371, 384

(56) References Cited

U.S. PATENT DOCUMENTS

| 277,650 A | 5/1883 | Wright | 335/75 |
|---|---|---|---|
| 765,980 A | 7/1904 | Mercier | 396/329 |
| 2,464,067 A | 3/1949 | Barker | 95/11 |
| 2,481,717 A | 9/1949 | Blair | 248/183 |
| 2,574,007 A | 11/1951 | Anderson | 255/51 |
| 2,614,471 A | 10/1952 | Markowitz | 95/86 |
| 2,794,512 A | 6/1957 | Martin | 181/0.5 |
| 2,794,612 A | 6/1957 | Clifton | 248/161 |
| 2,876,688 A | 3/1959 | Laue | 95/11 |

(List continued on next page.)

FOREIGN PATENT DOCUMENTS

| DE | 167405 | 1/1951 |
|---|---|---|
| GB | 2238933 A | 6/1991 |
| JP | 59-11939 | 1/1984 |
| JP | 10-75389 | 3/1998 |

OTHER PUBLICATIONS

Eagleye Dispatch, vol. 2, Summer 1995, Eagleye Technologies, Inc., Rome Georgia.
"The Jo Mount", p. 46, The PI Catalog, Thomas Investigative Publications, Austin, TX 18764, Winter 1997–98.
B & H advertisement showing 3000 Pro Camera Stabilization System and Vehicle Camera–Mount devices.
Wolfe Camera Catalog, p. 46, Clamp–Pod device.
Model 700 Eagleye ® camera system brochure, Eagleye Technologies, Inc., Rome, Georgia (undated).
Eagleye ® System Model 700 System Basic Features brochure, Eagleye Technologies, Inc., Rome Georgia (undated).
Model 700F System Specification brochure, (2pages), Eagleye Technologies, Inc., Rome. Georgia (undated).
Eagleye Dispatch, vol. 2, Summer 1995, Eagleye Technologies, Inc., Rome Georgia.
Panasonic brochure. AG–750.AG–720.AG710.
1190F (Mustang)Front seat head rest and related parts–Mustang convertible, CPD 2000 Version 10.07, Apr. 1998.
1997 A (Ford), Front seat mechanism– upper half– power—drivers side, CPD Version 10.07, Apr. 1998.

*Primary Examiner*—Chris Kelley
*Assistant Examiner*—Shawn S. An
(74) *Attorney, Agent, or Firm*—Baker, Donelson, Bearman & Caldwell

(57) ABSTRACT

A video imaging apparatus for receiving, recording, and displaying images from a vehicle in which the video camera connects to a lateral upper portion of a seat in the vehicle. A member communicates light representative of an image to an image receiver. A mount selectively orients the angular view of the image receiver. A method of providing vehicles with after-market imaging apparatus and installation thereof is disclosed.

7 Claims, 8 Drawing Sheets

U.S. PATENT DOCUMENTS

| | | | |
|---|---|---|---|
| 3,128,982 A | 4/1964 | Christopher | 248/183 |
| 3,141,393 A | 7/1964 | Platt | 95/1.1 |
| 3,349,679 A | 10/1967 | Lohman | 95/11 |
| 3,515,472 A | 6/1970 | Schwitzgebel | 352/132 |
| 3,545,710 A | 12/1970 | Mooney | 348/183 |
| 3,598,355 A | 8/1971 | English | 348/430 |
| 3,752,376 A | 8/1973 | Shelton et al. | 224/42.45 B |
| 3,951,448 A | 4/1976 | Hawie | 297/113 |
| 3,970,274 A | 7/1976 | Resk | 248/185 |
| 4,029,246 A * | 6/1977 | Woodruff | 224/42.45 B |
| 4,328,915 A | 5/1982 | Melton, III | 224/32 R |
| 4,645,320 A | 2/1987 | Meulling | 354/81 |
| 4,974,807 A | 12/1990 | Moineau | 248/539 |
| 5,230,490 A | 7/1993 | Sloop | 248/187 |
| 5,260,731 A | 11/1993 | Baker, Jr. | 354/81 |
| 5,282,182 A | 1/1994 | Kreuzer | 369/21 |
| 5,283,643 A * | 2/1994 | Fujimoto | 348/143 |
| 5,319,394 A * | 6/1994 | Dukek | 348/148 |
| 5,366,194 A | 11/1994 | Finney | 248/218.4 |
| 5,446,659 A | 8/1995 | Yamawaki | 364/424.03 |
| 5,664,840 A | 9/1997 | Stenzel | 297/391 |
| 5,677,979 A | 10/1997 | Squicciarini | 386/46 |
| 5,742,859 A | 4/1998 | Acker | 396/419 |
| 5,775,771 A | 7/1998 | La Cour et al. | 297/238 |
| 5,833,101 A | 11/1998 | Watkins | 224/275 |
| 5,833,739 A | 11/1998 | Ashihara | 359/462 |
| 5,895,086 A | 4/1999 | Carico | 296/37.6 |
| 5,978,017 A * | 11/1999 | Tino | 348/148 |
| 6,215,518 B1 * | 4/2001 | Watkins | 348/148 |

* cited by examiner

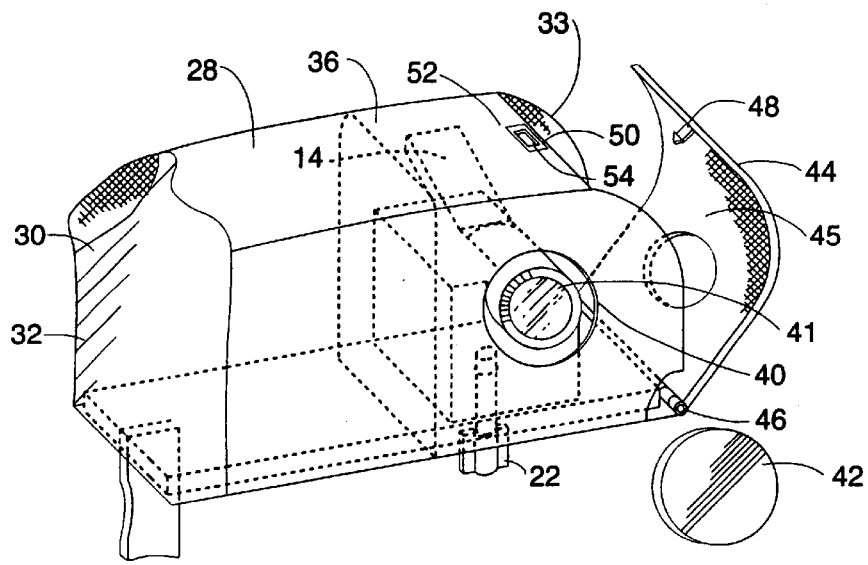
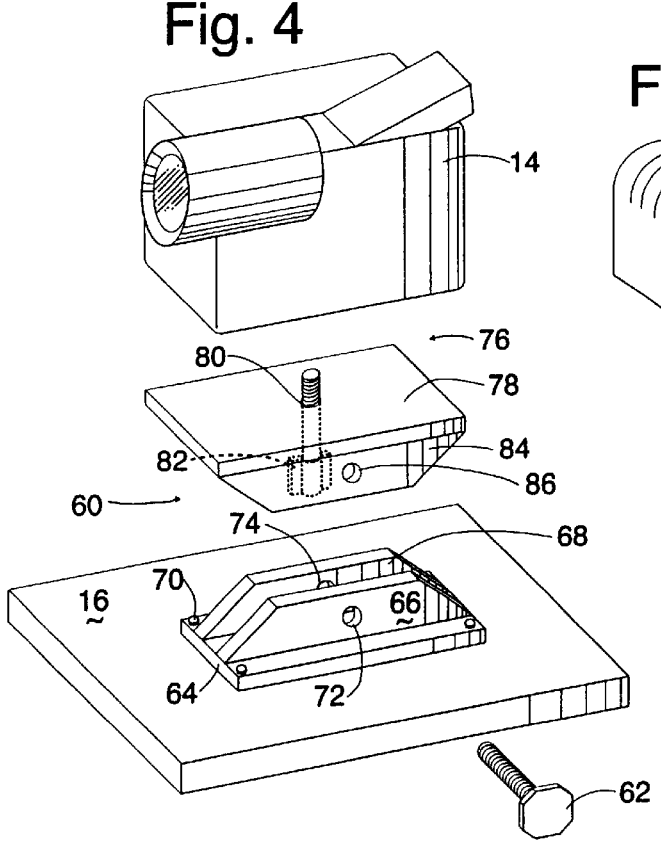
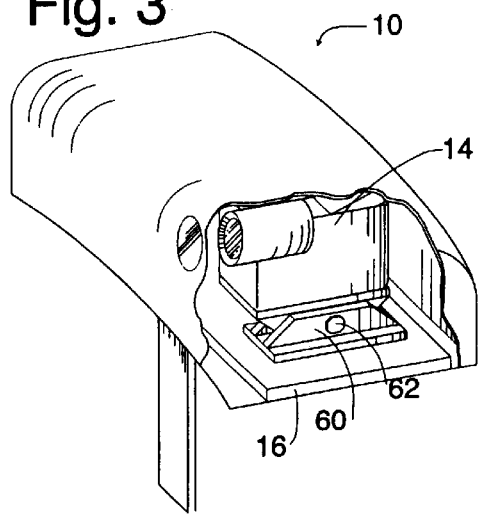

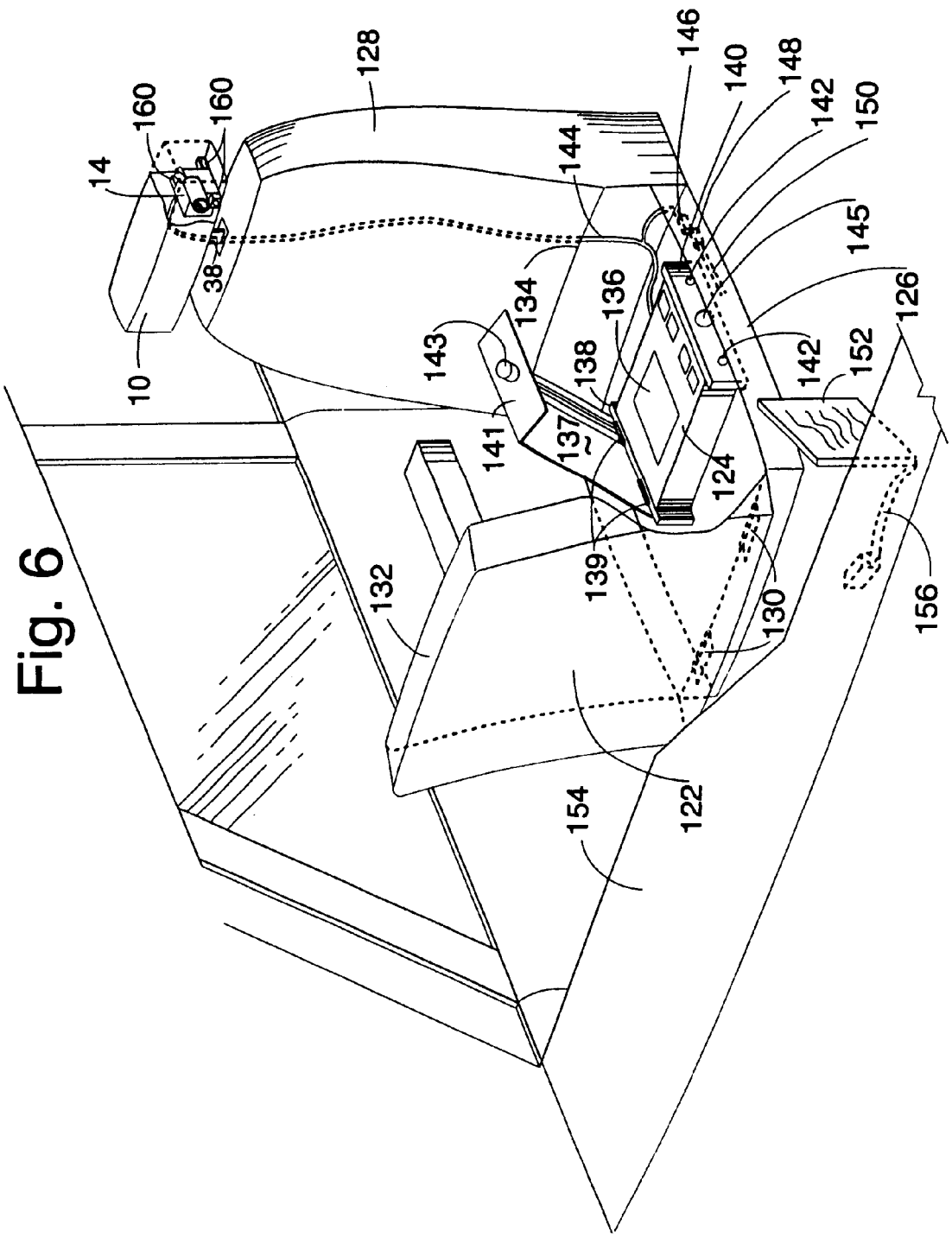

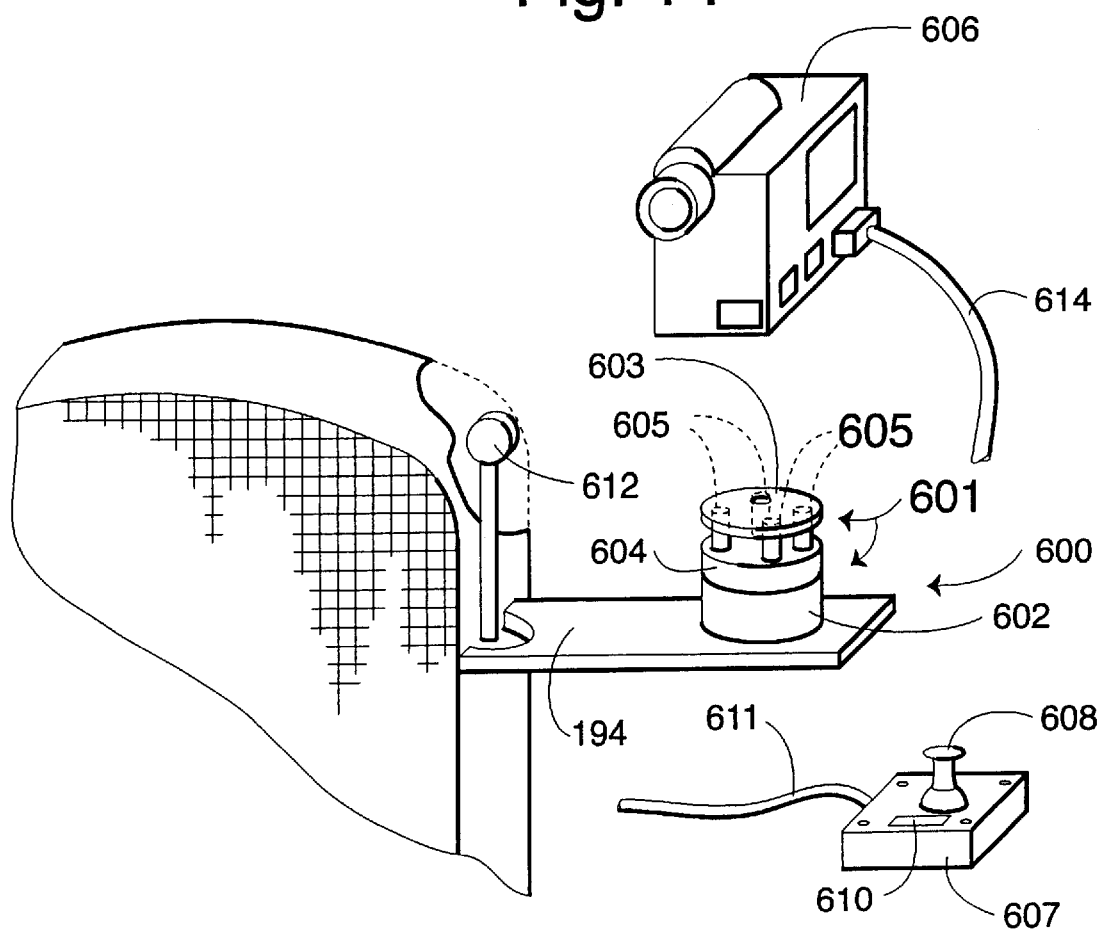

HEADREST AND SEAT VIDEO IMAGING APPARATUS

The present application is a continuation-in-part of U.S. Ser. No. 09/398,910 filed Sep. 14, 1999, as a continuation-in-part of U.S. Ser. No. 09/252,265, filed Feb. 18, 1999, as a continuation-in-part of U.S. Ser. No. 09/121,155 filed Jul. 22, 1998.

TECHNICAL FIELD

The present invention relates to apparatus for mounting video imaging equipment in vehicles. More particularly, the present invention relates to video and audio imaging apparatus incorporated with seats in vehicles.

BACKGROUND OF THE INVENTION

In recent years, military, taxis, private persons, police and private detectives have added video cameras to their equipment list for video recording of activities, persons, races, passing scenes, patrols and investigations. For police particularly, the video camera provides a visual record of events such as traffic stops, chases, and other incidents of law enforcement. Private detectives also record incidents for evidentiary purposes during investigations.

Various devices have been provided for supporting video cameras in vehicles. Stationary investigations allow use of tripods mounted in the vehicle to support the video cameras. The tripod readily stands in many vans or other trucks which have room for the legs to spread and thereby provide a stable foundation for using a video camera attached thereto. Tripods however are not readily adaptable for use in passenger vehicles which have limited space in the rear seat portion of the car. Generally, the legs are insufficiently separated for image recording stability.

For military, taxi, and police vehicles particularly, video cameras typically mount on U-shaped brackets attached to the forward portion of the roof adjacent the windshield. The bracket receives the video camera for a forward view through the windshield in order to provide a record of traffic stops, automobile chases, and the like. Other camera mounts have been used to secure video or television cameras within automobiles, such as race cars to provide a driver's perspective during an automobile race being broadcasted on television. One known device for mounting a camera in a car maintains the camera level with respect to the roads surface regardless of acceleration or gravitational forces. The camera is supported on a pendulum suspended from a gimble and constrained with spring and damping elements which match the vehicle suspension system in order to produce equal and opposite rotations of the pendulum in response to the movements of the vehicle.

Other devices are less complicated. One such device mounts a camera in a protective box which attaches to the rear deck of the vehicle near the back window. Telescoping members connect the box to the rear deck. Coil springs absorb shock in order to dampen vibrations communicated to the camera. Another device provides a channel member with a depending plate at one end. The plate is received in a slot of an upper edge of a car seat which normally receives a tongue or support member of a headrest. A distal end of the channel rests on top of the dashboard of the vehicle. A camera mounts with a bolt through an opening in the channel. An elastic hold-down and stabilizing cord is used to secure the distal end of the channel to the dashboard.

My U.S. patent application Ser. No. 08/919,298 discloses a transverse bar which connects at opposing distal ends to the supports for headrests in the seats of vehicles. The video camera mounts to a pivotable support attached to the transverse bar, whereby the camera may be oriented at a selected angle for recording.

While these devices have generally functioned to support a camera within a car, there are drawbacks to their use. Mounting the camera on a rear deck of a car does not satisfactorily show dashboard information which is useful and important during automobile races or other activities in which such information is important, e.g., auto racing, police incidents such as those that involve the stopping of a vehicle for example for excessive speed, accident recordation in vehicles such as trucks, trains, vessels or aircraft, driver training, storm chasing, surveying, private investigations, wildlife and hunting recordation, film for cinematography or advertising, television news, and other. Also this perspective view differs from that seen by the driver or operator of the vehicle. On the other hand, placing the camera closer to the windshield may have the camera to far forward to show the dashboard of the car which had key gauges, such as the speedometer, displaying information about the car. Brackets which are cantilevered in the car are susceptible to vibration as the distal end is not adequately secured. Further, such brackets that mount to the seat slot for headrest supports occupies one of the headrests and takes the space otherwise occupied by a passenger.

Also, surveillance security and other police activities however need the camera to be less visible from casual observation, which the present devices do not provide.

Further, while some video cameras incorporate a recording apparatus within the camera, often, the recorder is a separate component connected to the video camera by communication cables. As a separate component, the recorder is usually permanently mounted to a portion of the wall of the trunk of the vehicle. This makes access to the recorder and tapes cumbersome, time consuming, and unsatisfactory. Space within a police vehicle however is at premium for storage of equipment and materials. The video recorder needs to be secure so that it is not independently moving while the vehicle is traveling, yet must be readily and easily accessible for retrieval and exchange of recording tapes.

Accordingly, there is a need in the art for improved mounts for video recording equipment in vehicles. It is to such that the present invention is directed.

BRIEF SUMMARY OF THE INVENTION

The present invention meets the need in the art by providing a video and audio imaging apparatus incorporated with a vehicle seat for positioning in a vehicle for receiving video and audio images. The video and audio imaging apparatus and vehicle seat for positioning in a vehicle for receiving video images and audio comprises a vehicle seat having an elongate member extending from a lateral upper portion thereof. A panoramic mirror mounts in a distal end portion, which distal end portion communicates light therethrough to the mirror. An image receiving lens is placed at an opposing end of the tube for receiving images communicated by the mirror. A recorder is provided for recording signals representative of the images received by the lens.

In another aspect, the present invention provides a vehicle seat and video imaging apparatus, comprising a seat with a seatback and a support arm extending laterally therefrom. A pivoter connects to the support arm for selective angular orientation in at least a first axis relative to the support arm. A video imaging apparatus fixedly secures to the pivoter for imaging in one or more directions by selective positioning of said pivoter with the video imaging apparatus disposed laterally of the seat and substantially centrally relative to a central axis of the vehicle. The video imaging apparatus includes one or more lenses and is adapted to create one or more electrical signal representative of the images received by said one or more lens. A signal transmitting pathway provides for transmitting the one or more electrical signal to a signal receiving device communicating with the signal transmitting pathway.

BRIEF DESCRIPTION OF THE DRAWINGS

FIG. 2 is a cutaway detailed illustration of the headrest camera mount illustrated in FIG. 1.

FIG. 3 is a side cutaway view of an embodiment of the headrest camera mount including a support or pivotally positioning the camera at a selected angle.

FIG. 4 is a detailed exploded perspective view of the camera mount illustrated in FIG. 3.

FIG. 6 is a perspective view of a seat in a vehicle including the video headrest illustrated in FIG. 1, with a pivotable seat cushion for accessing a video recorder mounted in the seat.

FIG. 14 is a perspective view of a camera mount useful with the present invention.

DETAILED DESCRIPTION OF THE PREFERRED EMBODIMENTS

Figure 1:
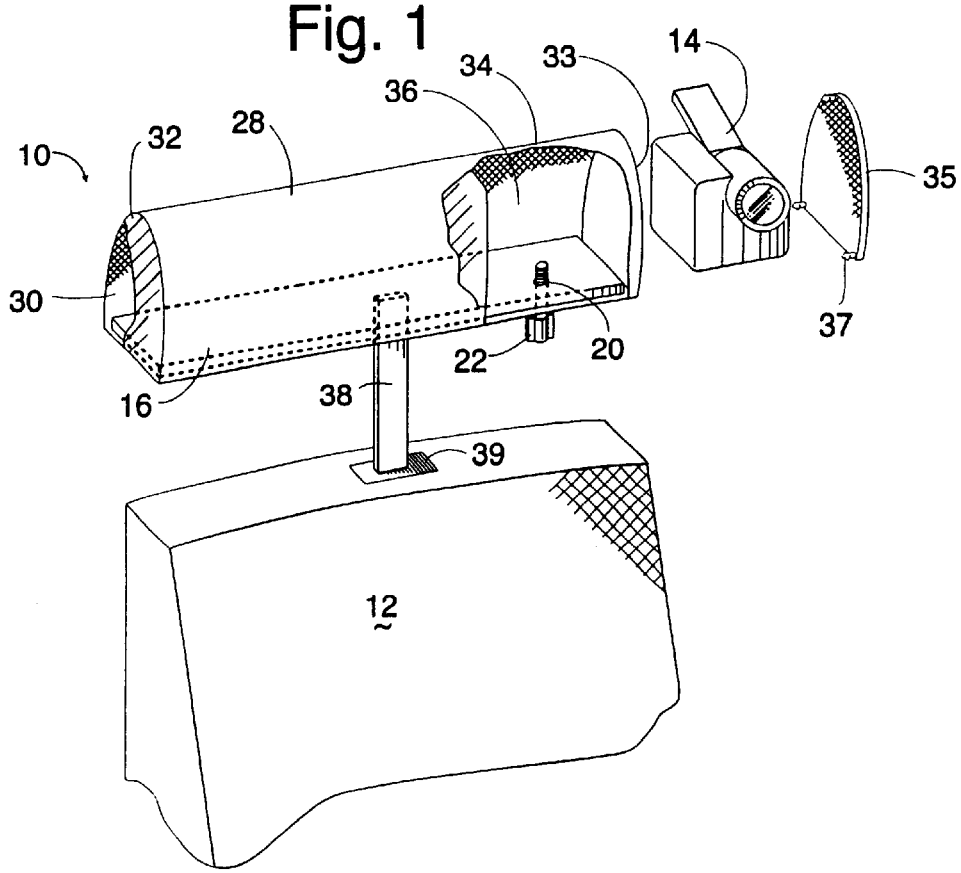
FIG. 1 illustrates in perspective view a headrest camera mount for attaching to the seat of a vehicle, according to the present invention.

Referring now in more detail to the drawings in which like parts have like identifiers, FIG. 1 illustrates in perspective view a headrest 10 that attaches to a seat 12 of a vehicle while containing a video camera 14 shown exploded away. The headrest 10 has an elongate member 16 in which a distal end 18 defines a bore 20. A threaded connector 22 extends through the bore 20. The connector 22 includes a groove which receives a C-ring. The C-ring conventionally prevents the connector 22 from coming out to the bore 20.

A cushion 28 for the headrest 10 includes a resilient cover 30 that encloses a foam core 32. The cushion 28 attaches conventionally to the elongate member 16. The core 32 does not extend the full length of the elongate member, so that a portion 34 of the cover 30 defines a cavity 36. The cavity 36 receives the video camera 14, which has a threaded bore in a bottom surface for engaging the connector 22. The video camera 14 thereby sits on the elongate member 16 and the connector 22 secures the video camera to the member. The headrest 10 defines an open end 33. The headrest 10 defines an open end 33 which is covered by a removable detachable plate 35. Pins 37 extend laterally from the plate 35 for engaging mating portions of the cover 30, whereby the headrest has a selectively closed distal end. Further, removal of the plate 35 permits access to control buttons on the video camera 14. A support 38 attaches conventionally to the member 16 and depends away from the headrest 10. The support 38 is received within a slot 39 in the seat 12 for connecting the headrest 10 to the seat 12.

As shown in FIG. 2, a front surface of the cover 30 defines an opening 40 through which a lens 41 receives light for communicating an image to the video camera 14. A detachable cap 42 exploded from the headrest 10 covers the opening 40 when the video camera 38 is removed or is not in use. In the embodiment illustrated in FIG. 2, the open end 33 is a closed by a door 44 that defines a side face of the cushion 28. The door 44 attaches along a hinge 46 to a lower portion of the cover 30. In the illustrated embodiment, the door 44 also defines an open port 45, which may be closed by a detachable cover (not illustrated) for a purpose discussed below. Other doors may be gainfully used; for example, a door which slides from a closed position to an open position. A pin 48 projects laterally from a distal portion of the door 44. A plate 50 attaches to an upper portion 52 of the side of the headrest 10. The plate 50 defines an opening 54 for receiving the pin 48 when the door for selectively holding the door closed. As may be appreciated by one of ordinary skill in the art, a back surface of the headrest 10 likewise may include an opening for the lens of video camera to record images from a rearward perspective. In an alternate embodiment, a recorder separate from the camera is mounted in the vehicle, for instance in the trunk. A cable (not illustrated) connects between the video camera 14 and the recorder.

FIG. 3 is a side cutaway view of the headrest 10 having a pivot support 6 rigidly connected to the members 16 a bolt 62 locks the pivot support 60 in a selected position whereby the video camera 14 is positioned at a selected angle. FIG. 4 provides a detailed exploded view of the pivot support 60 comprises a base plate 64 having a pair of upwardly extending spaced-apart parallel flanges 66, 68. The base 64 is rigidly connected to the member 16 with a fastener 70 such as bolts, rivets, or the like. The flanges 66, 68 in the illustrated embodiment have a trapezoid shape in end view, with the wider base of the trapezoid integral with the base plate 64. The flange 66 defines a bore 72. The flange 68 defines a threaded bore 74 co-axially aligned with the bore 72.

A pivot plate 76 defines a surface 78 on which the video camera 14 rests. The pivot plate 76 defines a bore 80 which receives a connector 82 for engaging the threaded bore in the video camera 14 whereby the video camera is rigidly connected to the pivot plate 76. A flange 84 depends from the surface 78 at one side. The flange 84 defines a bore 86 which is aligned with the bores 72 and 74 when the flange 84 is positioned between the flanges 66, 68.

Figure 5:
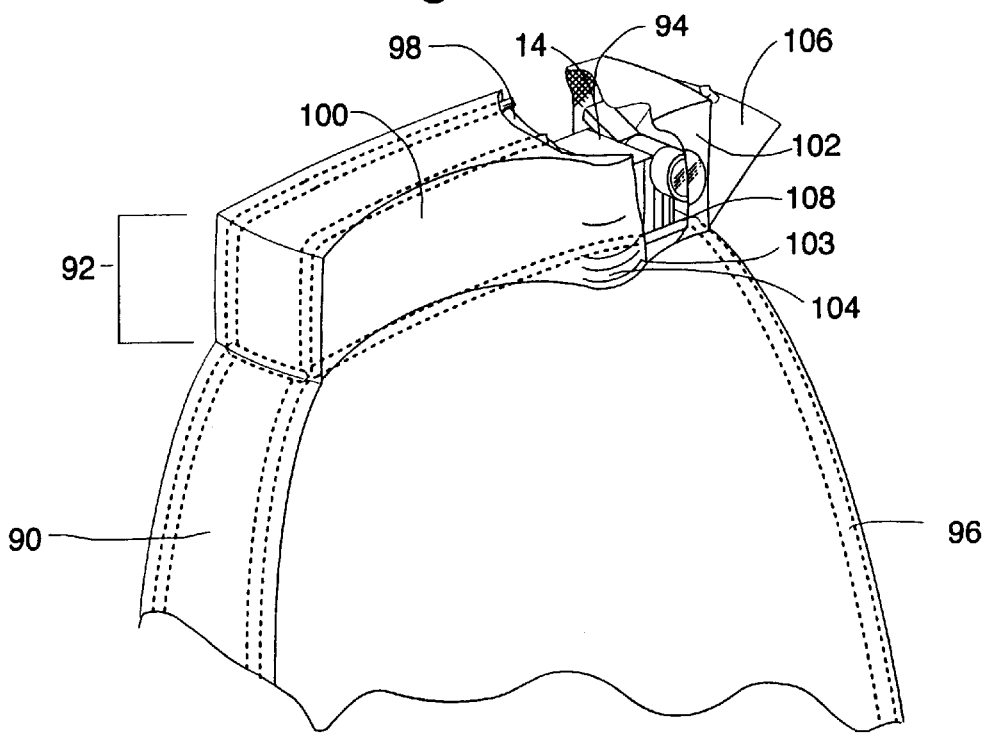
FIG. 5 is a perspective view of a seat back for a vehicle having an integral headrest with a camera mount according to the present invention.

FIG. 5 is a perspective view of a portion of a seat back for a seat in a vehicle. The seat back 90 includes an integral headrest generally 92 which defines a cavity 94 for receiving the video camera 14. The seat 92 has a frame 96 which defines a perimeter shape of the seat back 90 and the headrest 92. A core member formed of cushioning materials is received by the frame. A seat cover over lies the core member and the frame to define the seat back.

The headrest 92 includes a portion of the core member generally, a core body 98. Typically, the headrest portion of the seat is an extension of the seat back, and may be planer, or arcuate, to conform in style to the seat. In the particular illustrated embodiment, the core body has a main portion that defines a first concave recess 100 on a forward face of the core body. The recess 100 receives a head of a person occupying the seat. A second portion 102 of the core body 98 defines a second concave recess on the forward face of the core body lateral of the main portion 100. The first and second recesses 100 and 102 are separated by a forwardly projecting ridge 104. In an alternate embodiment (not illustrated), the second portion 103 defines a planer forward face. It should be noted that the ridge 104 cooperates with the extending opposite side of the recess 100 to receive the head of a seat occupant, while restricting the head from inadvertently blocking the view of the video camera 14.

The cavity 94 is defined within the second portion of the core body 102. A port in a side wall of the seat 90 is closed by a cover 106. The frame 96 engages a support member which defines a bore for receiving a threaded connector to which the video camera 14 is secured. The forward surface of the headrest 92 defines an opening in the second recess 102 whereby the lens of the video camera receives light for recording images. It is the noted that the support 60 illustrated in FIG. 3 may gainfully be installed in the cavity 94 for selectively positioning the video camera 14 in the integral seat back 90 for recording images.

FIG. 6 is a perspective view of a seat 120 in a vehicle, including the video headrest 10 with a seat cushion 122 shown in a pivoted position for accessing a video recorder 124 mounted within the seat. The seat 120 includes a frame 126 from which a seat back 128 extends. Conventional seatback adjustment mechanism may be included and are not otherwise illustrated for adjusting an angle of the seatback. The headrest 10 includes the camera 14 and mounts on supports 38 which extend from an upper portion of the seat back 128. The seat cushion 122 is selectively movable from a first position for sitting and a second position for accessing the video recorder 124. In the illustrated embodiment, the seat cushion 122 connects at a forward edge with hinges 130 to the seat frame 126. The hinges 130 permit the seat cushion 122 to move from the first position with the cushion received within the frame 126 for seating purposes and the second position, as illustrated. In the first position, a back edge 132 of the cushion 122 is received against a lower side face 134 of the seat back 128. The hinges 130 permit the seat cushion 122 to pivot forward, as illustrated, to the second position for providing access to the video recorder 124.

The video recorder 124 includes an access door 136 for receiving a video recording tape (not illustrated). In the illustrated embodiment, a pair of supports 138, 140 are fixedly secured within the seat frame 126 to a floorboard of the vehicle. In the illustrated embodiment, a plurality of threaded fasteners 142 extend through the supports 138, 140 to rigidly connect the recorder 124 to the supports. A cover 137 connects with hinges 139 to the support 138. A lip 141 of the cover 137 over hangs the support 140. The lip 141 includes a slot 143 for receiving a key that engages a lock 145 to secure the cover 137 closed over the video recorder 124.

A wiring harness 144 communicates between the recorder 124 and the video camera 14. A coupler 146 connects to a mating coupler 148 of a harness 150 for providing electrical power to the video recorder 124 and the camera 14 as well as providing control wiring for operation of the recorder and the camera. The video camera 14 and the recorder 124 also communicate with a video display screen 152 and can incorporate other functions such as position locating and speed detection devices. In the illustrated embodiment the video display screen 152 mounts in the dashboard 154. The video display screen 152 connects through a harness 156 to the harness 150, 144 for the video recorder 124 and the video camera 14, for display of images received by the camera or on a tape played by the recorder.

As illustrated, the present invention further provides a plurality of video cameras 160 that mount in the headrest 10. It should be appreciated that the video camera 14 is illustrated as a conventional type camera, and it is noted that smaller CCD (charge-coupled devices) functioning as cameras 160 provide the ability to receive images from a forward, side, and rear view. Similar cameras mounted in the adjacent headrest (not illustrated) provides coverage in the remaining side direction. Accordingly, multiple configurations of video image receiving cameras 14, 160 are available. In one embodiment, one video camera is preset for telephoto imaging and a CCD device 160 is preset for wide angle viewing. A controller enables a user to select between the cameras 14, 160 depending on the image to be recorded. For example, the camera 14 preset to telephoto would be used for recording a license plate and car from a long distance.

While the present invention is disclosed with respect to a single headrest in a vehicle, it is to be appreciated that the cameras 14, 160 could readily be mounted in the opposing end of the headrest for use on a driver's portion of the seats, whereby the cameras would also receive dashboard information, such as the speed of the vehicle or other vehicle speed via a detection device. In the embodiment having a plurality of side, rear, and forward view cameras 14, 160, a camera control module provides functional controls over the cameras and the recorder for on/off, telephoto, and camera selection, whereby the user can readily switch among selected views provided by the cameras. Further, in an alternate embodiment, the seat cushion 122 pivots about the back side, rather than the front. In a second alternate embodiment, the seat cushion 122 pivots from one side. It is noted that the present invention is likewise installable in either a passenger side or a driver side of the seat in the vehicle.

In an alternate embodiment, the video equipment communicates with a transmitter placed preferably behind the dashboard for broadcasting a video signal to a remote receiver, such as an operations control center.

Figure 7:
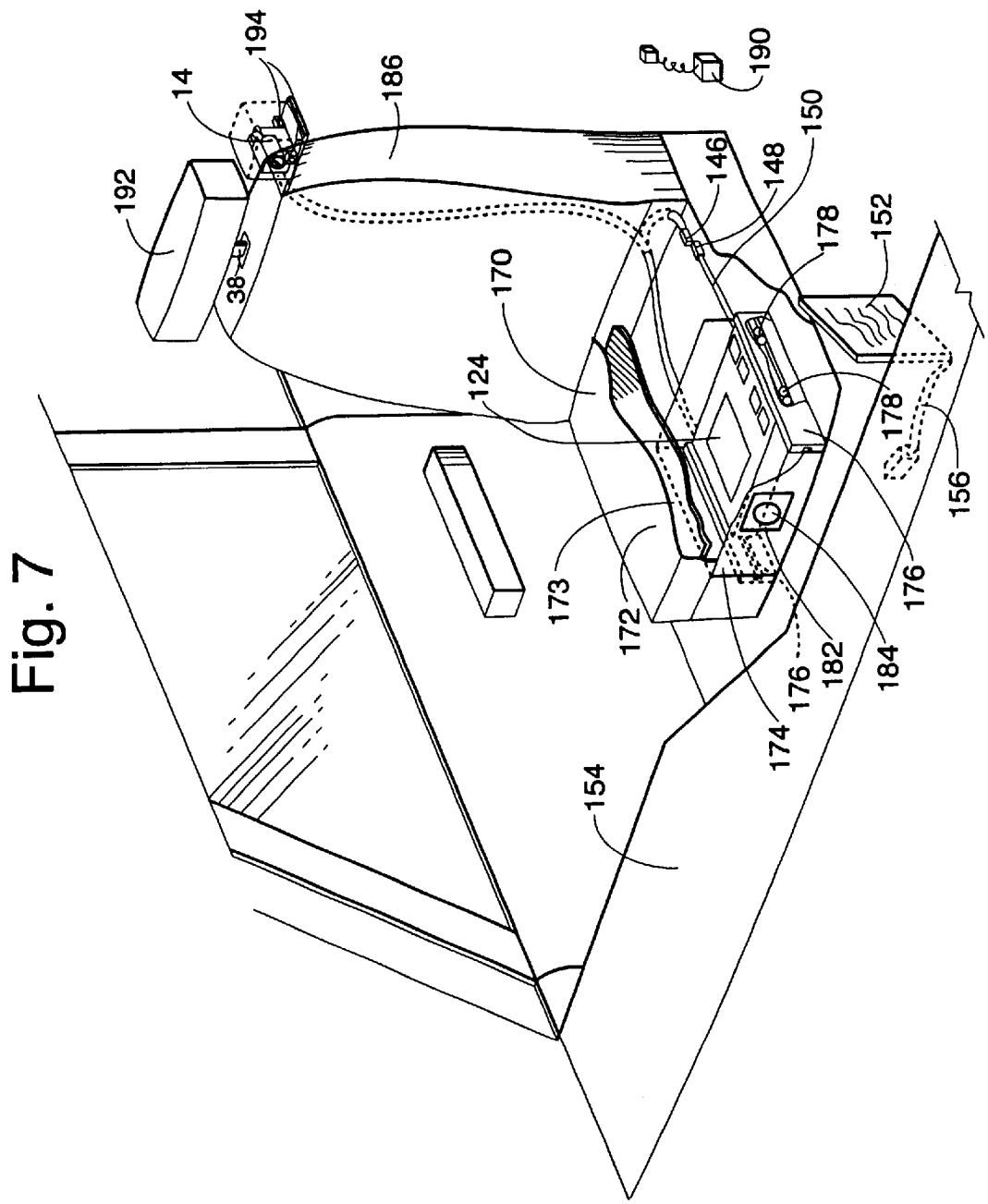
FIG. 7 is a perspective view of a seat in a vehicle with a video recorder slidably mounted in the seat.

FIG. 7 is a perspective view of a seat 170 in a vehicle, including a seat cushion 172 which encloses a sliding drawer 174 for holding the video recorder 124 mounted within the seat 170. A shield 173, such as a plastic sheet, prevents spilled liquids from entering the video recorder 124. The shield 173 in an alternate embodiment is a metal sheet to further restrict access to the video recorder 124. The video recorder 124 mounts securely, preferably with fasteners such as bolts (not illustrated), into the drawer 174. The sliding drawer 174 has a pair of opposing sliding arms 176 that define a channel in which pairs of aligned roller 178 travel. The rollers 178 connect with axles to the drawer 174; the sliding arms attach to the frame of the seat. Conventional drawer slides may be gainfully used, whereby the drawer 174 is movable from a first position recessed within the seat 170 and a second position outwardly of a forward face 180 of the seat 170. A front panel 182 of the drawer 174 includes a lock 184 for securing the drawer in the first position. The seat 170 includes a frame from which a seat back 186 extends. Conventional seatback adjustment mechanism may be included and are not otherwise illustrated for adjusting an angle of the seatback. One embodiment of this apparatus gainfully uses the headrest 10 that includes the camera 14 and mounts on supports 38 which extend from an upper portion of the seat back 186. The illustrated embodiment has a conventional headrest 192. A support 194 extends laterally from a shoulder portion of the back 186. The support 194 defines at least one hole for receiving a threaded fastener whereby the camera 14 is secured to the support 194. A housing is illustrated in phantom for enclosing the camera 14. In an alternate embodiment, the pivot support 60 is attached to the support 194 for engaging the camera 14.

The wiring harness 144 communicates between the recorder 124 and the video camera 14. The couplers 146, 148 connect to the harness 150 for providing electrical power to the video recorder 124 and the camera 14 as well as providing control wiring for operation of the recorder, the camera, and a microphone for audio signals. The microphone can be a conventional wireless microphone/transmitter such as the vest and shoulder microphone 190 typically used by police or a directly wired microphone for communicating with the video recorder 124. The video camera 14 and the recorder 124 also communicate with a video display screen 152 and can incorporate other functions such as position locating and speed detection devices. In the illustrated embodiment, the video display screen 152 mounts in the dashboard 154. In the illustrated embodiment, the housing for the video display 152 includes a plurality of control buttons for controlling the operation of the video camera 14, the video recorder 124, and the display 152. A controller is disclosed in my patent application Ser. No. 09/353,113, filed Jul. 14, 1999, with the United States Patent and Trademark Office, which application is incorporated herein by reference. The video display screen 152 connects through a harness 156 to the harness 150, 144 for the video recorder 124 and the video camera 14, for display of images received by the camera or on a tape played by the recorder.

As illustrated, the present invention gainfully uses the plurality of video cameras 160, which are preferably the smaller CCD (charge-coupled devices),CMOS, and the like, that function as cameras to provide the ability to receive images from forward, side, and rear views, selectively, with multiple configurations of video image receiving cameras 14, 160. The controller enables a user to select between the cameras 14, 160 depending on the image to be recorded.

Figure 8:
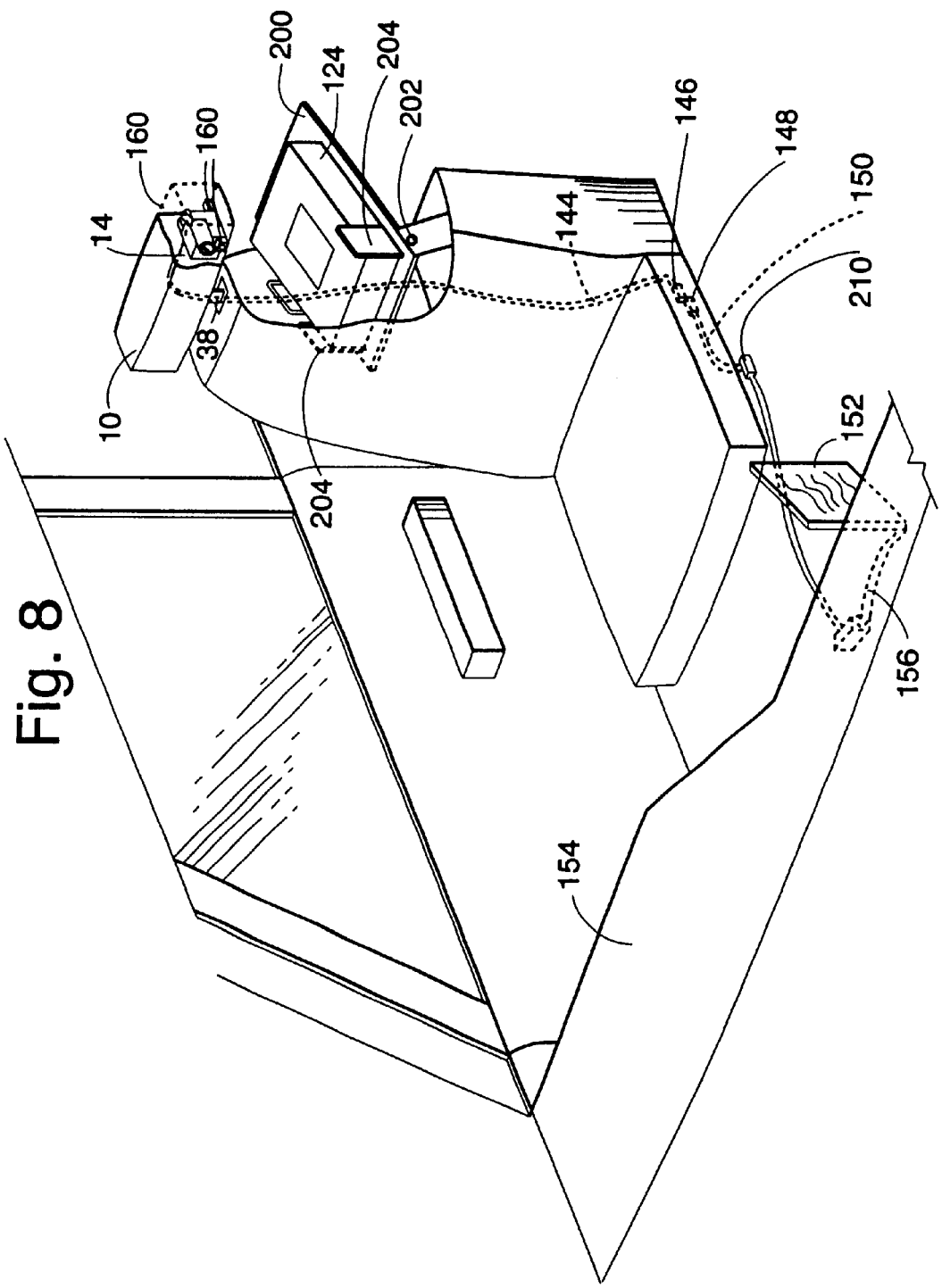
FIG. 8 is a perspective view of a seat in a vehicle with a video recorder mounted in the back of the seat.

FIG. 8 illustrates an alternate embodiment in which the video recorder 124 is mounted in the seat back 186. The video recorder 124 connects securely with fasteners to a door 200 that pivots on hinges 202 connected to a member 204 of the seat frame. The door 200 selectively includes a lock (not illustrated) for controlling access to the video recorder. The control cables 144 interconnect the video recorder 124, the camera 14, 160, and the controller/display 152, for operation of the video and audio imaging apparatus, with power supplied from the vehicle by a connector generally 210 into the wiring harness 144.

With reference to FIGS. 1 and 2, the video camera headrest mount of the present invention is incorporated in vehicles for use in recording images and audio from the vehicle. The disclosed embodiment shows the camera mount on a right side of the headrest 10 and the seat 90. It should be noted that the camera cavity 36 and 94 may be located on the left side thereof, or the cavity may be formed on both sides of the headrest and seat. The support 38 is slidingly received in the slot 39 in the back of the seat 12. As may be appreciated, some seats in vehicles have a pair of spaced-apart slots which each receive a tubular member extending from a conventional headrest, and such supports are likewise included with the scope of the present invention as alternative supports 38. Other headrests include apparatus for pivoting the headrest to accommodate personal preferences in positioning, and the present invention may include such additional features.

The door 44 is pivoted open by detaching the pin 48 from the opening 54 and pulling the door at its distal end 52 downwardly towards the seat 12. The video camera 14 is inserted through the opening in the side of the headrest 10 into the cavity 36. The connector 22 is threadably engaged to the video camera 14 to secure the video camera 14 with the lens aligned with the opening 40. The cap 42 is detached during operation of the video camera. The door 44 is pivoted closed with the pin 48 engaging the opening 54. Also, the video camera maybe oriented so that the lens is pointed towards the port 45, for recording images to the side of the vehicle.

With reference to FIGS. 3 and 4, the cavity 36 may include the pivot plate 60. The connector 82 extending through the pivot plate 76 engages the video camera 14. The bolt 62 is loosened and the pivot plate 76 tilted about the bolt with the flange 94 disposed between the flanges 66, 68. The bolt 62 is tightened when the pivot plate 76 is at the selected angle. The lens of the video camera aligns with the opening in the headrest for recording images.

With reference to FIG. 5, the seat back 90 is preferably installed as original equipment by the manufacturer of the vehicle, although a secondary market is not excluded. The cover 106 is detached from the side of the seat back 90. The video camera 14 is inserted into the cavity 94 and attached to the support by the threaded connector. The cover 106 is reinstalled, after the video camera 14 is started. In an alternate embodiment, remote control devices are used to control the operation of the camera.

For police operations, the video camera 14 is connected by a cable to a controller for activation of the recording. The video camera 14 records automatically when the siren or lights are activated, and such control device is conventional. The headrest according to the present invention provides a conventional appearing headrest independently insertable into the backs of seats in vehicles or integrally included in seatbacks, with the cavity for holding a video camera for recording. It is preferred that the video recorder 124 be digital, for a smaller size to fit a conventional size seat bottom. In an alternate embodiment, the headrest 10 and seat 90 receive a lens device which communicates by a cable to a separate recorder mounted elsewhere in the vehicle.

With reference to FIG. 6, the video recording mount for vehicles according to the present invention is operated by pivoting the seat 122 from the closed position for seating to the upright open position for accessing the video recorder 124 as illustrated in FIG. 6. The cover 137 is unlocked and pivoted open. The video recorder 124 is operated to open the door 136 for insertion or removal of video recording tapes as appropriate. The cover 137 is then moved to the second position and secured closed with the lock 145. The seat 122 is pivoted to the closed position for seating. The video recorder 124 accordingly is readily accessible to a police officer for exchange of video tapes without undue difficulty. The video recorder 124 and cameras 14, 160 are preferably linked by the controller to the operation of the vehicle emergency lights and siren. The cameras 14, 160 and the recorder 124 commence operation upon activation of the emergency lights or siren. However, the controller also provides for manual activation of the cameras 14, 160 and the recorder 124. The controller further allows selecting between the cameras 14, 160 for selective recording of various views from around the vehicle. The video image received by the cameras is selective recorded on the tape in the video recorder 124, or two or more of the video signals can be recorded on the tape for subsequent playback and use. A conventional remote control device as well as a wireless microphone communicates with the recorder 124. The wireless microphone permits the audio of the activity outside the vehicle to be recorded. The present invention accordingly provides a comprehensive video surveillance monitoring and recording apparatus in a vehicle, together with ready and convenient access to the recorder 124, the video camera 14, and a display screen 152. In an alternate embodiment, the video cameras 14, 160 are incorporated within an integral headrest as illustrated in FIG. 5.

With reference to the embodiment illustrated in FIG. 7, the video recorder 124 is accessible by unlocking the lock 184 and sliding the drawer 174 from the first position to the second position outwardly of the face 180 of the seat 170. The video tape is inserted, or replaced, by operating the controls of the video recorder 124 which are conventional, for opening and closing the video tape chamber. The drawer 174 in the illustrated embodiment moves on the rollers 178, or glides, plastic blocks, and the like, traveling in the channel arms 176, although other sliding members may be gainfully used. The drawer 174 is pushed back into the seat 170 to the second position, and the lock 184 is locked.

As discussed above, the video recorder 124 and cameras 14, 160 are preferably linked by the controller to the operation of the vehicle emergency lights and siren. The controller can be in-dash, such as the illustrated video display 152 or locally to the seat. The cameras 14, 160 and the recorder 124 commence operation upon activation of the emergency lights or siren. However, the controller also provides for manual activation of the cameras 14, 160 and the recorder 124. The cameras 14, 160 are disposed laterally of the central portion of the seat back 186 to avoid interference by a person in the seat to the images received by the cameras. The controller further allows selecting between the cameras 14, 160 for selective recording of various views from around the vehicle. The video image received by the cameras is selective recorded on the tape in the video recorder 124, or two or more of the video signals can be recorded on the tape for subsequent playback and use. A conventional remote control device as well as a wireless microphone 190 (or direct microphone) communicates with the recorder 124. The wireless microphone permits the audio of the activity outside the vehicle to be recorded. The present invention accordingly provides a comprehensive video surveillance monitoring and recording apparatus in a vehicle, together with ready and convenient access to the recorder 124, the video camera 14, and a display screen 152. In an alternate embodiment, the video cameras 14, 160 are incorporated within an integral headrest as illustrated in FIG. 5.

The apparatus of FIG. 8 is used similarly, by accessing the recorder 124 through the door 200, which pivots on the hinge 202, whereby tapes can replaced as necessary.

Figure 9:
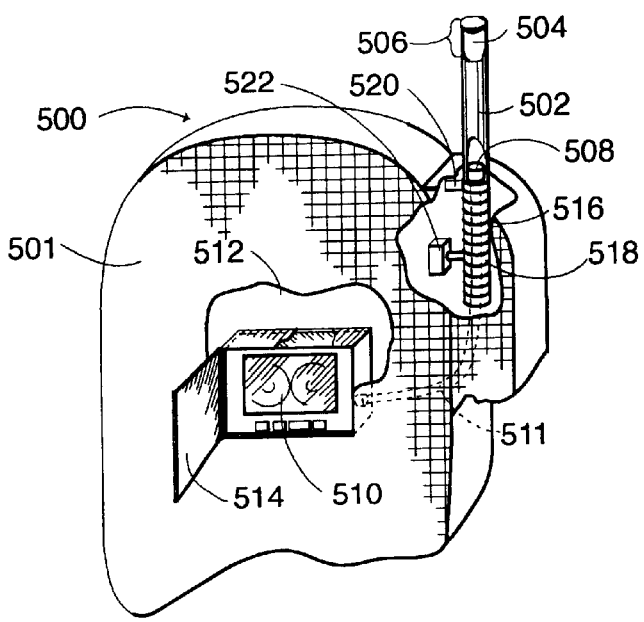
FIG. 9 is a perspective rear view of seat in a vehicle with a video imaging apparatus of the present invention.

FIG. 9 illustrates an image receiving apparatus 500 according to the present invention for use with a vehicle seat (a seatback portion 501 is illustrated). The image receiving apparatus 500 includes an elongate tube 502 that houses a panoramic mirror 504 inverted and secured in a distal end portion 506 of the tube 502. The portion 506 is transparent whereby light communicates through a side wall of the tube to the mirror 504. The mirror 504 deflects the light longitudinally along the tube 502. The remaining portion of the tube wall is preferably opaque to prevent light communication. This reduces glare and reflection of light within the tube. A lens 508 mounts at an opposing end of the tube 502. The lens 508 receives images from the light communicated through the side of the tube 502 and reflected by the mirror 504. The lens 508 communicates a signal representative of the image to an image storage device 510 In the illustrated embodiment, the lens 508 communicates the signal by a wiring harness 511 to a video image recorder 510. The video image recorder is preferably mounted to the structure of the vehicle in which the imaging receiving apparatus is installed. For example, the video image recorder 124 shown in FIG. 7 is mounted below the seat in a drawer or as shown in FIG. 5 below a pivotable seat cushion, but may also be disposed as illustrated in a pocket or recess 512 in a back of the seat, or within a dashboard, or other vehicle location, for access to the tape or other recording medium in the recorder. The recess 512 in the illustrated embodiment is closed by a door 514 and the door preferably includes a lock for securing the recorder from unauthorized access.

In the illustrated embodiment, the tube 502 is selectively extendable from a channel 516 defined in laterally portion of the back 501 of the seat. This positions the image-receiving tube 502 with lens laterally of the seat and substantially centrally relative to a central axis of the vehicle, and thereby allowing ordinary and conventional use of the seat and occupant protection features such as a headrests while operating the image-receiving apparatus of the present invention. Such provides a view and recordation of images that is substantially that of the person in the seat. In the illustrated embodiment, an end of the tube 502 bears against a spring 518 that biases the tube to an extended position. The tube includes a catch 520 that engages a release 522 that extends into the channel 516. The release 522 is selectively movable, whereby the tube 502 extends from the channel upon moving the release. The release 522 is operated manually by depressing a plate (not illustrated) or automatically by an electric solenoid-actuated trigger such as in an emergency vehicle in response to actuation of siren or emergency flashing lights.

The lens in the image receiving apparatus 500, and other embodiments described herein, is a light receiving and communicating device, such as a glass or plastic transparent body, a pinhole, an optical lens, CCD device, or other such image receiver. The image recording device is a conventional video tape recorder in an independent housing, a recorder contained within a housing with the lens, a digital recorder device, a writable light-sensitive recording/playing apparatus, or other such device using a recordable medium.

Figure 10:
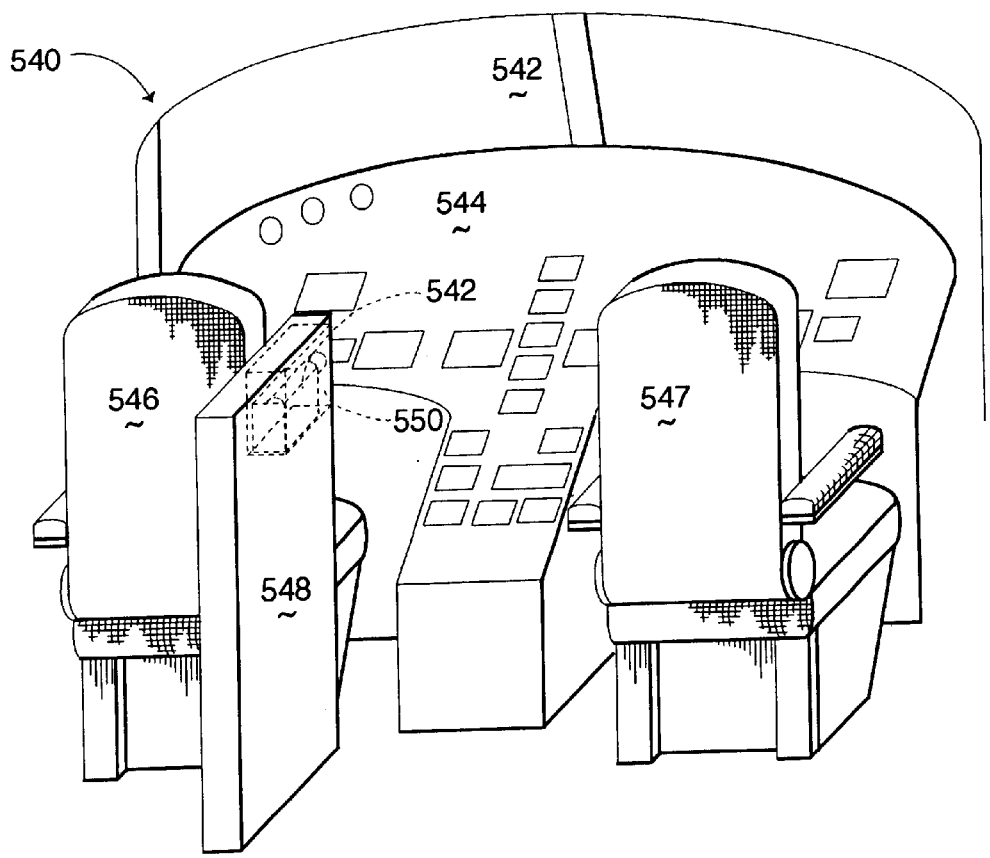
FIG. 10 is a perspective view of a cockpit of an aircraft with video imaging apparatus.

The invention of the present invention positions image receiving apparatus laterally of a vehicle seat and substantially centrally relative to a central axis of the vehicle to allow ordinary and conventional use of the seat and occupant protection features such as a headrests even while operating the image-receiving apparatus of the present invention, to provide viewing and recordation of images substantially that of the occupant of the seat. FIG. 10 is a perspective view of a cockpit generally 540 of an aircraft facing forward towards a windshield 542, instrument panel 544, and a pair of side-by-side seats 546, 547 for the pilots. A housing 548 extends from a structure of the cockpit 540. In the illustrated embodiment, the housing 548 stands adjacent the seat 546 extending upwardly from a floor of the cockpit 540. An upper portion of the housing 548 defines a cavity 550 for receiving an image receiving device 542 that communicates a signal representative of the received image to a recording device. In one embodiment, the image receiving device 542 is a self-contained video camera that houses a lens and recorder. In an alternate embodiment, the image receiving device 542 is a lens device that communicates to a remote recorder. The recorder may be modified for an endless-loop tape or recording media suitable for recording over a predetermined period. It is to be appreciated that embodiments of the present invention are likewise gainfully employed in other vehicles, including a train engine, a boat, a car, or other vehicle.

Alternate embodiments accommodate the crowded cockpits of many aircraft. In one embodiment, the housing 548 comprises an arm that extends from a structure of the cockpit, such as the ceiling or laterally from a side wall. A distal end portion of the arm defines the cavity 550 for receiving the image receiver 542. The cavity includes a mounting device for securing the image receiver therein. For a conventional video camera, the mounting device is a threaded bolt. A cover closes the cavity 550, and preferably, includes a lock to secure the image receiving device 542 within the cavity.

The image receiving device 542 receives images during operation of the aircraft. Preferably the receiving and recordation of images occurs automatically without requiring activation or attention by the crew. The image receiving device 542, being disposed laterally of the crew seat and centrally relative to a central axis of the aircraft, provides images from a view substantially that of the crew while not interfering with the use of the seat for flying purposes and without obstruction to the receiving of images.

Figure 11:
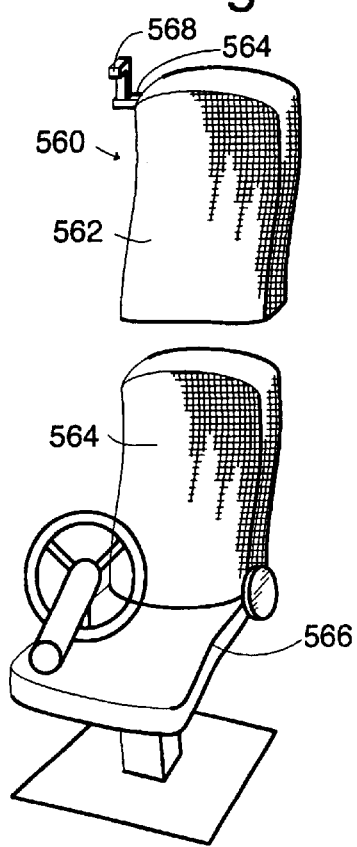
FIG. 11 is a front perspective view of a seat of a vehicle illustrating an alternate embodiment of the video imaging apparatus for after-market installation in a vehicle.
Figure 12:
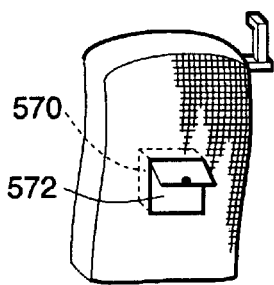
FIG. 12 is rear perspective view of the video imaging apparatus illustrated in FIG. 11.

FIG. 11 illustrates an image receiving and recording apparatus 560 of the present invention particularly adapted for retrofitting to existing seats with minimal changes. The apparatus 560 defines a sleeve 562 open at one end for slidingly covering a seatback 564 such as a seat 566 of a package delivery truck. The sleeve 562 has a support 564 at an upper end to which an image receiving device 568 connects. The support 564 extends laterally of the seat, whereby the image receiving device 568 is disposed laterally of the seat and substantially centrally relative to a central axis of the delivery truck. This allows ordinary and conventional use of the seat 566 and occupant protection features such as a headrest and seatbelts while operating the image-receiving apparatus 568 of the present invention to obtain images substantially from the prospective of the occupant of the seat. As illustrated in back view in FIG. 12, the sleeve 562 includes a pocket 570 for holding an image recorder. The pocket 570 includes a overlapping flap 572 that includes securing devices, such as snaps, matingly engagable fabric connectors, buttons, and the like for closing the pocket to hold the recording device within the pocket. The image receiving device 568 connects through a wiring harness to the image recorder. The wiring harness connects through a coupler to a wiring harness of the vehicle for providing a supply of power to the image receiver and the recorder. In an alternate embodiment, a controller connects to the wiring harness, whereby the image recorder is selectively operated in various modes such as recording or pause during operation of the delivery truck.

Figure 13:
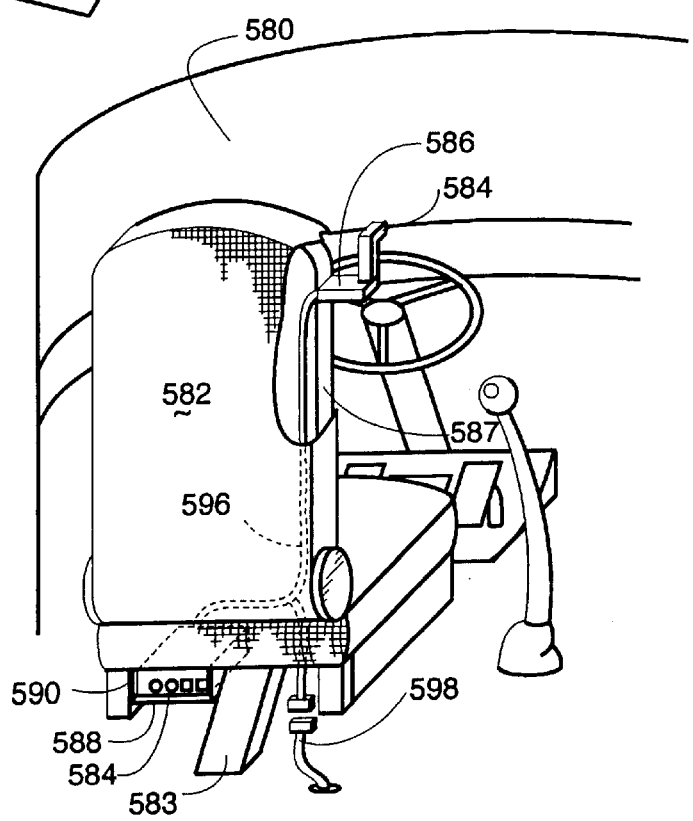
FIG. 13 is a perspective view of a delivery truck having an alternate embodiment of the imaging apparatus of the present invention.

FIG. 13 is a perspective view of a cab 580 of a vehicle, such as a vehicle used for package delivery. The cab 580 includes a seat 582 attached to a selectively positioned column 583 rigidly attached at one end to the floor of the cab. The seat 582 includes an image receiving apparatus 584 attached to a support 586. The support 586 attaches to a portion of a frame 587 for the seat 582. A tray 588 attaches to a second portion of the seat. In the illustrated embodiment, the tray 588 attaches to a bottom of the seat 582 with bolts passing through holes in laterally extending flanges 590. The tray 588 defines a surface to which a recording device 594 rigidly attaches. A wiring harness 596 connects between the recording device 594 and the imaging device. A portion of the wiring harness 596 connects to a power cable 598 of the delivery truck, for operating the recorder and the imaging device.

The imaging apparatus of the present invention is readily installed as an after-market product, particularly for delivery trucks and other vehicles for which recording of the operation and activities of the vehicle is important, such as for accident incident monitoring. The seat 582 is opened in an upper portion to expose the frame member 587. The support 586 is rigidly attached to the frame member 587. This is accomplished by welding or with bolts connecting the two together. The tray 588 is installed. Although not illustrated, bolts pass through holes in the opposing flanges 590 to secure the tray 588 to the bottom of the seat 582. In an alternate embodiment, the tray mounts to an side portion of the seat 582, where access and mounting may be easier in some seats. The recording device 594 is secured to the tray. The wiring harness 596 is connected between the imaging device 584, the recorder 594, and the power supply 598 of the vehicle. The cover of the seat 582 is closed to enclose the attachment of the support 586 to the frame 587. The imaging apparatus 584 is operated to record images of the operation of the vehicle from the cab 580. The support 586 preferably disposes the image receiving device 584 laterally of the seat and substantially centrally relative to a central axis of the vehicle to allow ordinary and conventional use of the seat even while operating the image-receiving apparatus, to provide viewing and recordation of images substantially that of the occupant of the seat, in accordance with the present invention.

FIG. 14 is a perspective view of a camera mount 600 useful with the present invention. The camera mount 600 includes a base 602 that attaches to the support 194 of the seatback 186 (as illustrated in FIG. 7). A rotatable plate 604 pivotably connects to the base 602 for selective rotation relative to the base as indicated by the arrow 601. A plurality of pins 605 are received in holes in the plate 604. The pins 605 selectively move between a retracted position and an extended position. An outward end of each of the pins 605 connects to a support plate 603. A video imaging device 606, such as a video camera, mounts to the support plate 603. A controller 607 includes a movable arm 608 and a rocker switch 610 which are operatively coupled through control wiring 611 to the base 602 for operating the rotatable plate 604 and the pins 605. The controller 607 preferably mounts (not illustrated) to a structure of the vehicle, such as a dashboard or arm, which position is readily reachable during operation of the vehicle. In the illustrated embodiment, a microphone 612 mounts in the seatback 186 with a face towards a rear portion of the vehicle. In an alternate embodiment, the microphone is unidirectional and mounts in an upper surface of the seatback 186. The microphone 612 communicates through a wiring harness 614 to the video imaging device 606, which wiring harness also communicates with a power supply and a controller for operating the modes of the camera imaging device and a recorder connected thereto.

The video imaging support 600 is used for selective angular orientation relative to the support arm for positioning the view of the video imaging device 606 relative to the seatback 186. The arm 608 is manipulated, forward, back, and laterally, to cause the pins 605 to move relative to the rotatable plate 604. As the pins 605 move in and out between the retracted position and the extended position, the plane defined by the support plate 603 is caused to move, thereby changing the angulation of the view of the video imaging device. Further, the rocker switch 610 is selectively operated to cause the rotatable plate 604 is rotate relative to the base 602. The rotatable plate 604 is selectively positioned within the range of movement relative to the base 602. The microphone 612 communicates sound from within the vehicle to the recorder associated with the video imaging apparatus.

It is thus seen that an improved headrest and seat video imaging apparatus is provided for mounting a video camera and recorder in a vehicle as an integrated system. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. A video and audio imaging apparatus and vehicle seat for positioning in a vehicle for receiving video images and audio, comprising:
 a vehicle seat having an elongate member extending from a lateral upper portion thereof;
 a panoramic mirror mounted in a distal end portions and which distal end portion communicates light theretrough to the mirror;
 an image receiving lens at an opposing end of the member for receiving images communicated by the mirror; and
 a recorder for recording signals representative of the images received by the lens.

2. The video imaging apparatus and vehicle seat as recited in claim 1, wherein the member is selectively extendable from a channel in the seat.

3. The video imaging apparatus and vehicle seat as recited in claim 1, wherein the member is a tube.

4. A vehicle seat and video imaging apparatus, comprising:
 an seat with a seatback and a support arm extending laterally therefrom;
 a pivoter connected to the support arm, said pivoter adapted for selective angular orientation in at least a first axis relative to the support arm;
 a video imaging apparatus fixedly secured to the pivoter for imaging in one or more directions by selective positioning of said pivoter with the video imaging apparatus disposed laterally of the seat and substantially centrally relative to a central axis of the vehicle;
 said video imaging apparatus including one or more lenses and adapted to create one or more electrical signal representative of the images received by said one or more lens; and
 a signal transmitting pathway for transmitting said one or more electrical signal; and
 a signal receiving device communicating with the signal transmitting pathway.

5. The vehicle seat and video imaging apparatus as recited in claim 4, wherein said pivoter further comprises a rotator for rotating the angle of view of the video imaging device in a second axis relative to the support.

6. The vehicle seat imaging apparatus as recited in claim 5, further comprising a controller for selectively positioning the rotator and the pivoter.

7. The vehicle seat imaging apparatus as recited in claim 4, further comprising a controller for selectively positioning the pivoter.

* * * * *